(No Model.)
C. EDWARDS.
PROCESS OF PURIFYING METALS.
No. 314,004. Patented Mar. 17, 1885.
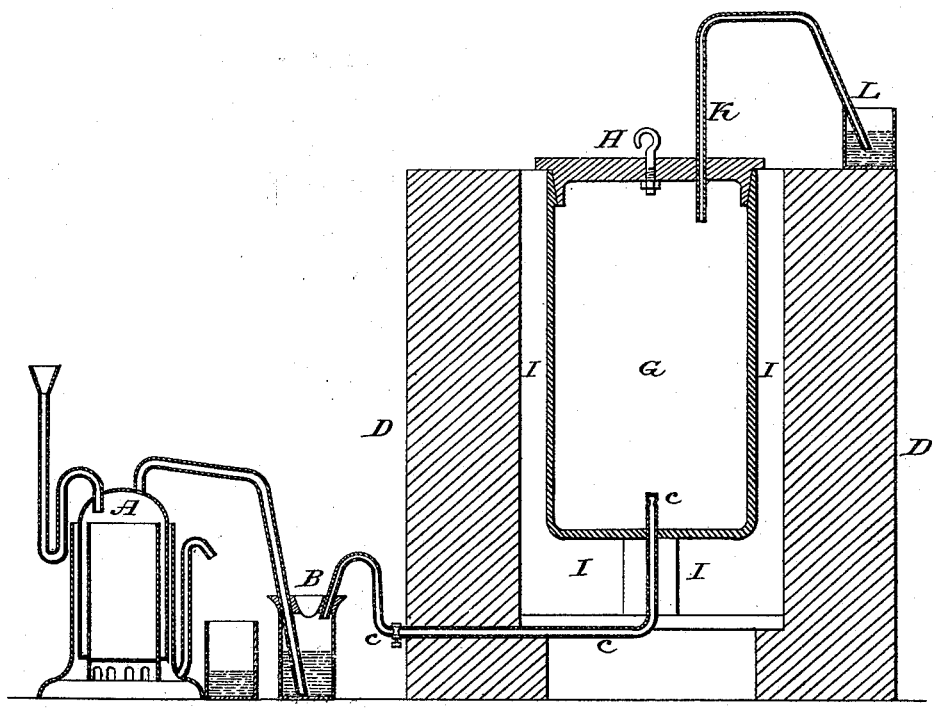
Witnesses:
Solon C. Kemon
H. B. Brown
Inventor:
Chas. Edwards
By Mann
Attorneys

UNITED STATES PATENT OFFICE.

CHARLES EDWARDS, OF PARIS, FRANCE.

PROCESS OF PURIFYING METALS.

SPECIFICATION forming part of Letters Patent No. 314,004, dated March 17, 1885.

Application filed April 26, 1883. (No model.) Patented in France June 7, 1882, No. 149,437; in Belgium July 11, 1882, No. 58,434; in England July 13, 1882, No. 3,333; in Norway January 23, 1883; in Sweden June 23, 1883, and in Austria-Hungary August 7, 1883, No. 12,932 and No. 31,599.

*To all whom it may concern:*

Be it known that I, CHARLES EDWARDS, of Paris, France, have invented a Process for the Purification of Metals, especially Iron, of which the following is a specification.

The drawing is a sectional elevation of apparatus that may be used.

My invention relates to the application of a current of moist hydrogen (previously passed through one or more baths) to metals—such as cast or other iron and malleable steel of the Bessemer sort—in order to take from them all or a part of the metalloids which deteriorate their quality for practical uses.

The metals to be treated are placed in suitable retorts. In this case I show an iron retort, G, which is enameled internally to prevent waste of the hydrogen gas through the pores of the metal. The retort is hermetically closed by covers having sealed joints.

A little tube, $c$, serves for the inlet of gas, and another, $k$, for the outlet of the gas. These tubes are of metal—for example, iron. The outlet-tube $k$ is immersed in a reacting liquid—a copperas liquid, for example—contained in a receptacle, L, the triple object of which is, first, to prevent the atmospheric air from entering the apparatus; second, to show (by its changed appearance) the departure of the impurities separated by the hydrogen from the metal treated; and, third, to regulate at pleasure the pressure of the gas in the apparatus.

When the retorts are charged, they are easily closed, and then it is possible to produce in the interior of the retorts the necessary pressure for making the hydrogen penetrate to the heart of the metal. The retorts are heated to a temperature of from 600° to 700° centigrade (1,112° to 1,292° Fahrenheit)—that is, to the temperature between dark red and cherry red—by means of the fire-place I, and maintained at that temperature during all the time of the operation, which varies according to the nature and the size of the pieces treated. When the "reactive" employed is a solution of sulphate of copper, and when the retort has obtained a red heat, a precipitate is formed in the receptacle L, which is more abundant the greater the impurity of the material treated. This precipitate is generally composed of sulphur, phosphorus, copper, and silica.

To produce the reaction, the hydrogen must be moist, for dry hydrogen does not act on metalloids, except carbon. I therefore charge the hydrogen with moisture by causing it to pass through one or more receptacles, B, placed between the generator A and the brickwork D of the fire-place, and the following effect is produced: The hydrogen takes with it a part of the moisture, which penetrates to the pores of the metal. At the temperature of 600° or 700° centigrade the vapor decomposes the combinations of the iron with the metalloids, (sulphur, phosphorus, silica, arsenic, azote, &c.,) which are thus freed in the state of hydrogenous gas. The excess of hydrogen prevents the oxidization of the iron and destroys the oxidized particles which are frequently found in the interior of pieces of steel and iron and prevent the welding of their molecules. The hydrogen acts also on the carbon. A part is freed in the state of carbonated hydrogen if cast or highly-carbureted material is being treated, and the other part remains in the mass, where it is distributed in a regular manner.

When a retort is charged with material to be treated and the joints are carefully closed, the heating commences. When the retort has attained a dark-red heat, a current of carbonic-acid gas is introduced into the retort by the same tube which serves later for the introduction of hydrogen, which carbonic-acid gas expels all the air contained therein. This done, the inlet-tube is closed, and as the outlet-tube is immersed in a reacting liquid the air cannot re-enter the apparatus. This operation does away with all danger of accident. The operation is finished when there is no more precipitate formed in the reacting liquid. The inlet of hydrogen is stopped, that which fills the retort is freed by a current of carbonic acid, and then it can be opened without the least danger, and the retort can be charged for a new operation.

Having thus described all that is necessary to a full understanding of my invention, what I claim as new is—

The process of purifying metals, which consists in passing moist hydrogen over the metal while at a temperature of 600° to 700° centigrade in an air-tight retort, as described.

CHARLES EDWARDS.

Witnesses:
ROBT. M. HOOPER,
JEAN BAPTISTE ROLLAND.